(12) United States Patent
Ohashi

(10) Patent No.: US 12,360,341 B2
(45) Date of Patent: Jul. 15, 2025

(54) IMAGING LENS, CAMERA, AND PORTABLE INFORMATION TERMINAL APPARATUS

(71) Applicant: Kazuyasu Ohashi, Chiba (JP)

(72) Inventor: Kazuyasu Ohashi, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 807 days.

(21) Appl. No.: 17/427,916

(22) PCT Filed: Feb. 17, 2020

(86) PCT No.: PCT/JP2020/006106
§ 371 (c)(1),
(2) Date: Aug. 3, 2021

(87) PCT Pub. No.: WO2020/179424
PCT Pub. Date: Sep. 10, 2020

(65) Prior Publication Data
US 2022/0026670 A1    Jan. 27, 2022

(30) Foreign Application Priority Data
Mar. 7, 2019    (JP) .................................. 2019-041727

(51) Int. Cl.
*G02B 9/34*    (2006.01)
(52) U.S. Cl.
CPC ...................... *G02B 9/34* (2013.01)
(58) Field of Classification Search
CPC ... G02B 9/34; G02B 9/60; G02B 9/62; G02B 15/144; G02B 2003/0093; G03B 17/12
(Continued)

(56) References Cited

U.S. PATENT DOCUMENTS 4,787,718 A * 11/1988 Cho ............... G02B 15/144507
359/686
2013/0070346 A1* 3/2013 Hsu .................... G02B 13/0045
359/713
(Continued)

FOREIGN PATENT DOCUMENTS

JP         4-212916        8/1992
JP         7-270679        10/1995
(Continued)

OTHER PUBLICATIONS

Gross, Herbert, ed. Handbook of Optical Systems, vol. 3: Aberration Theory and Correction of Optical Systems. vol. 3. Wiley-Vch, 2005. (Year: 2005).*
(Continued)

*Primary Examiner* — Marin Pichler
*Assistant Examiner* — Justin W. Hustoft
(74) *Attorney, Agent, or Firm* — XSENSUS LLP

(57) ABSTRACT

An imaging lens includes sequentially a first lens group, a second lens group having a positive refractive power, an aperture stop, a third lens group having a positive refractive power, and a fourth lens group. The first lens group includes, sequentially from the object side to the image side, a positive lens having a convex surface facing the object side, and a negative lens having a concave surface facing the image side. The second lens group includes a negative lens disposed closest to the object side and having a concave surface facing the object side, and a positive lens disposed closer than the negative lens to the image side and having a convex surface facing the object side. The third lens group includes a positive lens having a convex surface facing the image side, and a negative lens. The fourth lens group includes a negative lens having a concave surface.

21 Claims, 24 Drawing Sheets

(58) Field of Classification Search
USPC .......................................................... 359/771
See application file for complete search history.

(56) References Cited

U.S. PATENT DOCUMENTS

| | | |
|---|---|---|
| 2013/0321936 A1 | 12/2013 | Ohashi |
| 2019/0121062 A1 | 4/2019 | Ohashi |
| 2019/0154946 A1 | 5/2019 | Ohashi |

FOREIGN PATENT DOCUMENTS

| | | |
|---|---|---|
| JP | 4212916 B2 * | 1/2009 |
| JP | 2013-195587 | 9/2013 |
| JP | 2013-250534 | 12/2013 |
| JP | 2017-049572 | 3/2017 |
| JP | 2019-079033 | 5/2019 |

OTHER PUBLICATIONS

International Search Report issued on May 14, 2020 in PCT/JP2020/006106 filed on Feb. 17, 2020, 10 pages.

* cited by examiner

IMAGING LENS, CAMERA, AND PORTABLE INFORMATION TERMINAL APPARATUS

CROSS-REFERENCE TO RELATED APPLICATIONS

The present application is based on PCT filing PCT/JP2020/006106, filed Feb. 17, 2020, which claims priority to Japanese Patent Application No. 2019-041727, filed Mar. 7, 2019, the entire contents of each are incorporated herein by reference.

TECHNICAL FIELD

The present disclosure relates to an imaging lens, a camera, and a portable information terminal apparatus.

BACKGROUND ART

Digital cameras that form an image captured by an imaging lens onto an imaging element to perform image-capturing are widely used.

Among the digital cameras, there are strong requests for compact cameras with high image quality that use a relatively large imaging element having a diagonal length in a range of from about 20 to about 45 mm and that include a single-focus lens with high performance. For a further request, greater emphasis is placed on being excellent in portability, that is, being compact in addition to having high performance.

In recent years, a request increases for a compact imaging lens having an angle of view of so-called "semi-wide angle" having a half angle of view in a range of from about 25 to about 33 degrees. The semi-wide angle corresponds to a focal length in a range of from about 46 to about 33 mm in terms of a film camera having a size of 35 mm (so called Leica size).

Moreover, a relatively large imaging element has no serious disadvantage even when ambient rays are incident on a sensor obliquely by a certain degree because of improvement or optimization of an on-chip microlens and development in image processing. Specifically, even when the angle defined between a principal ray and the optical axis at the maximum image height is in a range of from about 30 to about 40 degrees, a system that sufficiently accommodates brightness shading or color shading in a sensor peripheral area can be constructed. Thus, a lens type more suitable for a decrease in size can be selected irrespective of the normal incidence of ambient rays unlike the existing type.

In this case, examples of a lens type suitable for a decrease in size in a semi-wide angle range include a substantially symmetrical type, and a telephoto type in which a lens group having a negative refractive power is disposed on an image side. PTL 1 and PTL 2 disclose such types of imaging lenses.

However, an imaging lens disclosed in PTL 1 has a design in the time of film cameras, and does not have sufficient imaging performance for a digital camera.

Moreover, an imaging lens disclosed in PTL 2 has a large lens total length (the distance from the surface disposed closest to an object side of a lens system to an image surface) and a large lens total thickness (the distance from the surface closest to the object side to the surface closest to an image side of the lens system) is large, thereby being disadvantageous in terms of a decrease in size.

CITATION LIST

Patent Literature

[PTL 1] JP-7-270679-A
[PTL 2] JP-2013-195587-A

SUMMARY OF INVENTION

Technical Problem

An object of the present disclosure is to provide a new and high-performance imaging lens having a semi-wide angle and being suitable for a decrease in size.

Solution to Problem

In view of the above, there is provided an improved imaging lens including sequentially from an object side to an image side, a first lens group, a second lens group having a positive refractive power, an aperture stop, a third lens group having a positive refractive power, and a fourth lens group having a negative refractive power. The first lens group includes, sequentially from the object side to the image side, a positive lens having a convex surface facing the object side, and a negative lens having a concave surface facing the image side. The second lens group includes a negative lens disposed closest to the object side and having a concave surface facing the object side, and a positive lens disposed closer than the negative lens to the image side and having a convex surface facing the object side. The third lens group includes, sequentially from the object side to the image side, a positive lens having a convex surface facing the image side, and a negative lens. The fourth lens group includes a negative lens having a concave surface facing the object side.

Advantageous Effects of Invention

With the disclosure, a new and high-performance imaging lens having a semi-wide angle and being suitable for a decrease in size can be provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
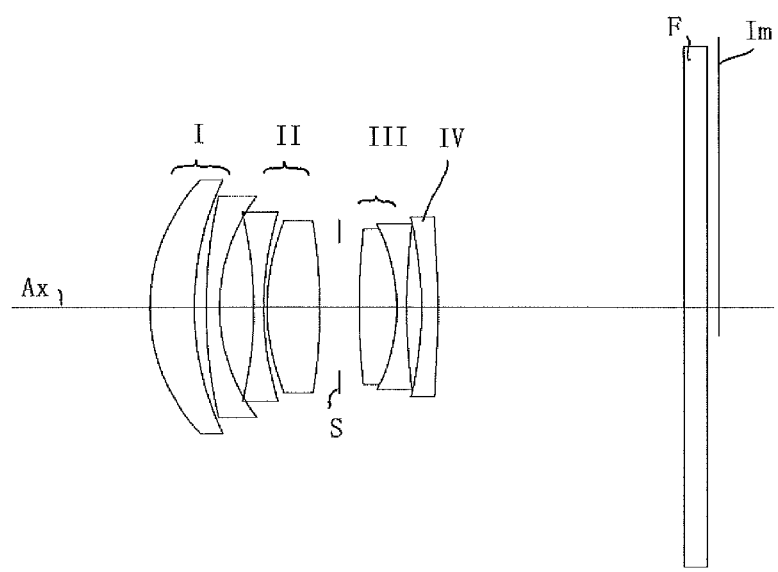
FIG. 1 is a cross-sectional view illustrating a configuration of an imaging lens according to Example 1.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIGS. 1 to 10 illustrate imaging lenses according to ten exemplary embodiments. The embodiments correspond to specific Example 1 to Example 10 which will be described later in the order of illustration.

In FIGS. 1 to 10, the left in each drawing is an object side and the right in each drawing is an image side.

For the convenience of description, reference signs are commonly used in FIGS. 1 to 10. Reference sign Ax in each drawing denotes an optical axis, reference sign I denotes a first lens group, reference sign II denotes a second lens group, reference sign S denotes an aperture stop, reference sign III denotes a third lens group, and reference sign IV denotes a fourth lens group.

Reference sign F denotes a "transparent parallel plate" intending one of various filters including an optical low-pass filter and an infrared-cut filter, and a cover glass (seal glass) for an imaging element such as a complementary metaloxide-semiconductor (CMOS) sensor. The transparent parallel plate is indicated as being "optically equivalent" to the intended component.

Reference sign Im denotes an image surface. When an imaging element is used, the light-receiving surface of the imaging element corresponds to the image surface Im. The imaging lens according to any one of the embodiments of the disclosure has a "basic configuration" as follows.

That is, the imaging lens has a four-lens-group configuration including, sequentially from the object side to the image side, a first lens group I, a second lens group II having a positive refractive power, an aperture stop S, a third lens group III having a positive refractive power, and a fourth lens group IV having a negative refractive power. The first lens group I is composed of, sequentially from the object side to the image side, a positive lens having a convex surface facing the object side, and a negative lens having a concave surface facing the image side.

The second lens group II is composed of a negative lens disposed closest to the object side and having a concave surface facing the object side, and a positive lens disposed closer than the negative lens to the image side and having a convex surface facing the object side.

The third lens group III is composed of, sequentially from the object side to the image side, a positive lens having a convex surface facing the image side, and a negative lens.

The fourth lens group IV is composed of a negative lens having a concave surface facing the object side.

In addition, the following configuration may be employed.

While the second lens group II is composed of, as described above, "a negative lens having a concave surface facing the object side" disposed closest to the object side, and "a positive lens having a convex surface facing the object side" disposed closer than the negative lens to the image side, the second lens group II may be composed of as a whole one of a subgroup of two lenses in total including one negative lens and a positive lens, and a subgroup of three lenses in total including two negative lenses and a positive lens.

That is, in examples illustrated in FIGS. 1 to 7, and 10, the second lens group II as a whole is composed of "a subgroup of two lenses in total including a negative lens and a positive lens". In examples illustrated in FIGS. 8 and 9, the second lens group II as a whole is composed of "a subgroup of three lenses in total including two negative lenses and a positive lens".

The fourth lens group IV may be composed of "one of a lens and a cemented lens", and has on the object side "a surface having a stronger refractive power than a surface on the image side". In examples illustrated in FIGS. 1 to 9, the fourth lens group IV is composed of "a lens". In an example illustrated in FIG. 10, the fourth lens group IV is "a cemented lens". In any of the above cases, "the refractive power of the surface on the object side" of the fourth lens group IV is stronger than "the refractive power of the surface on the image side".

In this case, "the surface having a stronger refractive power than the surface on the image side" is, at least in a paraxial area, "the surface on the object side having a stronger refractive power than the surface on the image side". In the example illustrated in FIG. 6, the fourth lens group IV is a lens. Both surfaces of the lens have aspherical surfaces and have curvature radii that change in a lens radial direction.

In this example, regarding the refractive powers of both surfaces of the fourth lens group IV, "the refractive power of the surface on the object side is stronger than the refractive power of the surface on the image side" in a paraxial area close to the optical axis.

The imaging lens having the above-described configuration desirably satisfies at least any one of Conditional Expressions (1) to (3), and (6) to (8) from among Conditional Expressions (1) to (8).

When Conditional Expression (3) is satisfied, at least one of Conditional Expressions (4) and (5) is desirably satisfied.

$$1.0 < L/f < 1.6 \quad (1)$$

$$0.45 < D_T/f < 0.80 \quad (2)$$

$$0.4 < f_{1P}/f < 1.5 \quad (3)$$

$$0.25 < r_{1F}/f < 0.55 \quad (4)$$

$$0.8 < r_{1F}/r_{1R} < 1.6 \quad (5)$$

$$-4.0 < f_4/f_1 < 2.0 \quad (6)$$

$$0.25 < f_{1-2}/f_{3-4} < 5.0 \quad (7)$$

$$-1.5 < r_{2F}/f < -0.5 \quad (8)$$

The conditional expressions include parameters having signs. The signs have meanings as follows:

L is a distance from a surface disposed closest to the object side of the first lens group to an image surface in a state focused on an object at infinity;

f is a focal length of a whole system in the state focused on the object at infinity;

$D_T$ is a distance from a surface disposed closest to the object side of the first lens group to a surface disposed closest to the image side of the fourth lens group;

$f_{1p}$ is a focal length of the positive lens in the first lens group;

$r_{1F}$ is a curvature radius of a surface on the object side of the positive lens in the first lens group;

$r_{1R}$ is a curvature radius of a surface on the image side of the negative lens in the first lens group;

$f_1$ is a focal length of the first lens group;

$f_4$ is a focal length of the fourth lens group;

$f_{1-2}$ is a composite focal length of the first lens group and the second lens group;

$f_{3-4}$ is a composite focal length of the third lens group and the fourth lens group; and $r_{2F}$ is a curvature radius of a surface on the object side of the negative lens disposed closest to the object side of the second lens group.

As described above, the second lens group II and the third lens group III both have positive refractive powers, and the fourth lens group IV has a negative refractive power. The first lens group I and the fourth lens group IV may satisfy Conditional Expression (6) and hence the first lens group I may have either one of "a positive refractive power and a negative refractive power".

The imaging lens according to the disclosure is a semi-wide angle lens having "characteristics slightly closer than a substantially symmetrical type to a telephoto type".

"Proper lens configuration and power arrangement" not found in related art can decrease all the lens total length, lens total thickness, and lens diameter.

As described above, the "imaging lens" according to the disclosure is based on "power arrangement of a substantially symmetrical type" and "a type suitable for a relatively wide angle of view" in which positive elements are disposed in front and rear of the aperture stop S and a negative element is disposed outside the positive elements. The "imaging lens" allows easy correction of coma aberration, distortion, and lateral chromatic aberration.

Furthermore, "a surface on the object side" of the positive lens of the second lens group and "a surface on the image side" of the positive lens of the third lens group both have convex surfaces facing each other, and "a surface on the image side of the negative lens" of the first lens group and "a surface on the object side of the negative lens (element)" of the fourth lens group both have concave surfaces facing each other. Thus, the aforementioned aberrations can be corrected at higher levels.

The configuration in which "a surface on the object side of the negative lens disposed closest to the object side of the second lens group has a concave surface" included in the above-described configuration has an effect of decreasing the diameter of the first lens group and allowing "coma aberration of lower rays to be corrected" easily. The configuration is advantageous for both a decrease in size and an increase in performance.

To effectively attain a decrease in size of the semi-wide angle imaging lens, it is required to change the power arrangement of the substantially symmetrical type and to apply "power arrangement close to so-called telephoto type". In the imaging lens according to the disclosure, "the positive lens having a relatively strong power is disposed closest to the object side of the lens system, and the negative lens of the third lens group and the negative lens of the fourth lens group are continuously disposed closest to the image side of the lens system". Thus, power arrangement desirable for a decrease in size is provided.

In addition, the position of an exit pupil is controlled, and hence the incident angle of a principal ray at a peripheral image height onto an image surface can be set to a proper state.

As described above, the imaging lens according to the disclosure is configured such that the first lens group I and the second lens group II disposed closer than the aperture stop S to the object side each include "as a whole, four to five lenses", the third lens group III and the fourth lens group IV disposed closer than the aperture stop S to the image side each include "as a whole, three to four lenses", thereby having a relatively "simple configuration". In addition, the configurations of the respective components are optimized for the purpose of use, which synthetically leads to advantageous effects not found in related art, thereby also attaining an increase in diameter, a decrease in size, and an increase in performance.

The meanings of the respective conditional expressions are described in detail below. Conditional Expression (1) determines the lens total length of the imaging lens (the distance from the surface disposed closest to the object side of the lens system to the image surface), to exhibit the advantageous effects of the disclosure most sufficiently. Conditional Expression (2) determines the lens total thickness of the imaging lens (the distance from the surface closest to the object side to the surface disposed closest to the image side of the lens system), to exhibit the advantageous effects of the disclosure most sufficiently.

The imaging lens according to the disclosure is composed of a positive lens disposed closest to the object side of the lens system and having a relatively strong power to attain "a decrease in size and an increase in performance".

If the parameter of Conditional Expression (3) is less than or equal to the lower limit of 0.4, "the characteristics of the telephoto type rather than the symmetrical type" is enhanced, the principal point moves toward the object side, and the lens total length decreases. However, "the degree of freedom to correct various aberrations" may be likely limited, and the sensitivity to a manufacturing error may likely increase.

If the parameter of Conditional Expression (3) is more than or equal to the upper limit of 1.5, it is difficult to have required telephoto characteristics, the principal point moves toward the image side, and the lens total length may not be decreased.

If the parameter of Conditional Expression (4), which is desirably satisfied based on that Conditional Expression (3) is satisfied, is less than or equal to the lower limit of 0.25, the refractive power of the surface on the object side of the positive lens in the first lens group is excessively large, the surface may have excessive aberration and may not be sufficiently corrected. Inward coma aberration may likely remain and astigmatism may likely occur at an intermediate image height.

If the parameter of Conditional Expression (4) is more than or equal to the upper limit of 0.55, the refractive power of the surface on the object side of the positive lens in the first lens group is excessively small, the telephoto characteristics are insufficient, and the insufficient telephoto characteristics are disadvantageous for "a decrease in the lens total length." When the lens total length is forcedly decreased in this state, outward coma aberration may likely remain and astigmatism may likely occur at a peripheral image height.

Conditional Expression (5) is to determine a desirable range of "the ratio of the curvature radius of the surface disposed closest to the object side to the curvature radius of the surface disposed closest to the image side" of the first lens group defining a parameter of Conditional Expression (5).

The surface on the object side of the positive lens included in the first lens group and the surface on the image side of the negative lens included in the first lens group "properly exchange aberrations with each other" to correct the aberration of the whole lens system.

If the parameter of Conditional Expression (5) is less than or equal to the lower limit of 0.8, spherical aberration may be likely over-corrected and inward coma aberration may likely occur.

If the parameter of Conditional Expression (5) is more than or equal to the upper limit of 1.5, spherical aberration may be likely under-corrected and outward coma aberration may likely occur.

The imaging lens according to the disclosure is configured such that "the incident angle of a principal ray, which reaches the maximum image height, onto the image surface is slightly larger than the half angle of view" to be decreased in size and increased in performance.

If the parameter of Conditional Expression (6) is less than or equal to the lower limit of −4.0, the exit pupil moves toward the image side, and the incident angle of the principal ray at the peripheral image height onto the image surface may be likely increased. If the parameter of Conditional Expression (6) is more than or equal to the upper limit of 2.0, the exit pupil moves toward the object side, and the fourth lens group may be likely increased in diameter.

Conditional Expression (7) is to balance well the refractive powers in front and rear of the aperture stop S.

If the parameter of Conditional Expression (7) is less than or equal to the lower limit of 0.25, the refractive power on the front side with respect to the aperture stop S is relatively excessively large, distortion may likely bend to the plus side in a peripheral area, inward coma aberration may likely occur, and lateral chromatic aberration with short wavelengths may likely occur inward of the screen.

If the parameter of Conditional Expression (7) is less than or equal to the upper limit of 5.0, the refractive power on the rear side with respect to the aperture stop S is relatively excessively large, distortion to the minus side may likely occur, outward coma aberration may likely occur, and lateral chromatic aberration with short wavelengths may likely occur outward of the screen.

If the parameter of Conditional Expression (8) is less than or equal to the lower limit of −1.5, coma aberration of lower rays (coma flare) may likely occur at an intermediate image height to the plus side, and astigmatism may likely occur. Furthermore, off-axis rays passing through the first lens group pass through a high position, and hence the first lens group may be likely increased in size.

If the parameter of Conditional Expression (8) is less than or equal to the upper limit of −0.5, coma aberration of lower rays (coma flare) may likely occur at an intermediate image height to the minus side, and spherical aberration may be likely over-corrected. The imaging lens according to the disclosure further desirably satisfies the following conditional expressions.

$$0.40 < Y/f < 0.70 \tag{9}$$

$$0.50 < \tan(\theta P_{max}) < 0.85 \tag{10}$$

In the conditional expressions, Y is "the maximum image height", and $\theta P_{max}$ is "an incident angle of a principal ray, which reaches the maximum image height, onto the image surface".

Conditional Expression (8) determines the angle of view of the imaging lens, to exhibit the advantageous effect of the disclosure most sufficiently.

Conditional Expression (9) determines the incident angle of off-axis rays of the imaging lens onto the image surface, to exhibit the advantageous effect of the disclosure most sufficiently.

For the configuration of the imaging lens according to the disclosure, "the surface disposed closest to the image side of the second lens group" and "the surface disposed closest to the object side of the third lens group (the surface on the object side of the positive lens in the third lens group)" both desirably have convex surfaces.

The imaging lens according to the disclosure is based on "the power arrangement of the substantially symmetrical type" as described above. The power arrangement of the substantially symmetrical type is applied also to "the two surfaces facing each other with the aperture stop interposed therebetween" to correct coma aberration, distortion, and lateral chromatic aberration at "higher levels".

Specifically, a conditional expression is desirably satisfied as follows:

$$-1.6 < r_{3F}/r_{2R} < 0.0, \quad (11)$$

where $r_{3F}$ is "a curvature radius of a surface disposed closest to the object side of the third lens group" and $r_{2R}$ is "a curvature radius of a surface disposed closest to the image side of the second lens group".

The surface on the image side of the negative lens included in the third lens group preferably has a concave surface. That surface is disposed to face the surface disposed closest to the object side and having the concave surface of the second lens group to balance correction of various aberrations.

Moreover, a curvature radius $r_{3R}$ of a surface on the image side of the negative lens included in the third lens group desirably satisfies the following conditional expression.

$$0.7 < r_{3R}/f < 2.5 \quad (12)$$

"The surface on the image side" of the fourth lens group is desirably a convex surface to arrange that surface to face a surface on the object side of the positive lens included in the first lens group, and to balance correction of various aberrations.

Specifically, a curvature radius $r_{4R}$ of a convex surface on the image side of the fourth lens group desirably satisfies the following conditional expression.

$$-1.8 < r_{4R}/f < -0.5 \quad (13)$$

The surface on the object side of the fourth lens group is a concave surface. To arrange that surface to face a surface on the image side of the negative lens included in the first lens group, and to balance correction of various aberrations, the curvature radius $r_{4F}$ desirably satisfies the following conditional expression.

$$-1.2 < r_{4F}/f < -0.3 \quad (14)$$

Furthermore, a refractive index $nd_{1P}$ of a material of the positive lens of the first lens group desirably satisfies the following conditional expression.

$$nd_{1P} > 1.75 \quad (15)$$

If the parameter of Conditional Expression (15) is less than or equal to the lower limit of 1.75, field curvature may be likely under-corrected and astigmatism may likely remain. Note that the upper limit of Conditional Expression (15) is in a range of from about 2.0 to about 2.1 with regard to the range of the refractive index and the cost of an existing optical glass.

A refractive index $nd_{2P}$ of a material of the positive lens included in the second lens group desirably satisfies the following conditional expression.

$$nd_{2P} > 1.75 \quad (16)$$

If the parameter of Conditional Expression (16) is less than or equal to the lower limit of 1.75, field curvature may be likely under-corrected and inward coma aberration may likely remain at an intermediate image height. Note that the upper limit of Conditional Expression (16) is in a range of from about 2.0 to about 2.1 with regard to the range of the refractive index and the cost of an existing optical glass.

To correct aberration more properly, it is desirable that "the first lens group and the fourth lens group have aspherical surfaces". The aspherical surface has a large advantageous effect on correction of astigmatism, coma aberration, and distortion.

EXAMPLES

Hereinafter, ten specific examples of the imaging lenses are described.

As described above, Example 1 to Example 10 are specific numeric value examples of the lens configurations illustrated in FIGS. 1 to 10.

In Example 1 to Example 10, the maximum image height is 14.2 mm.

As illustrated in FIGS. 1 to 10, the filter F is disposed on the object side of the image surface Im and on the image side of the imaging lens. As described above, the filter F is intended to be one of various filters including an optical low-pass filter and an infrared-cut filter, and a cover glass (seal glass) for a light-receiving element such as a CMOS sensor. The filter F is a transparent parallel plate as being "optically equivalent" to the intended part.

In any of the following examples, the transparent parallel plate F is disposed so that a surface on the image side thereof is disposed at a position of about 0.7 mm from the image surface Im to the object side. However, the configuration is not limited thereby. The transparent parallel plate F may not be a plate and may be divided into a plurality of plates.

In the examples, the signs have meanings as follows:
f is a focal length of the whole system;
F is an F-number;
ω is a half angle of view;
R is a curvature radius;
D is a surface distance;
$N_d$ is a refractive index;
$v_d$ is an Abbe number;
$P_{g,F}$ is a partial dispersion ratio ($P_{g,F}$ ($n_g - n_F$)/($n_F - n_C$));
K is a conic constant of an aspherical surface;
$A_4$ is a fourth-order aspherical coefficient;
$A_6$ is a sixth-order aspherical coefficient;
$A_8$ is an eighth-order aspherical coefficient;
$A_{10}$ is a tenth-order aspherical coefficient;
$A_{12}$ is a twelfth-order aspherical coefficient; and
$A_{14}$ is a fourteenth-order aspherical coefficient.

"An aspherical surface" is expressed by the following known expression using a paraxial curvature (the reciprocal of a paraxial curvature radius) C, a height H from the optical axis, a conic constant K, and an aspherical coefficient $A_i$ (i=2 to 14).

$$X = CH^2/[1 + \sqrt{(1-(1+K)C^2H^2)}] + A_4H^4 + A_6H^6 + A_8H^8 + A_{10}H^{10} + A_{12}H^{12} + A_{14}H^{14}$$

Example 1

Example 1 has the lens configuration illustrated in FIG. 1. (Table 1)
f=25.99, F=2.86, ω=28.3
Surface No. R D $N_d$ $v_d$ $P_{g,F}$ Glass name
01  10.596  2.71  1.83481  42.74  0.5648  OHARA S-LAH55VS
02  17.116  0.72
03  28.454  0.80  1.76182  26.52  0.6136  OHARA S-TIH14
04  10.633  2.07
05  −22.521  0.60  1.64769  33.79  0.5938  OHARA S-TIM22
06  18.475  0.20
07*  11.864  3.20  1.83220  40.10  0.5714  OHARA L-LAH90
08*  −29.60  01.20
09  stop  1.20
10  39.863  2.28  1.88300  40.76  0.5667  OHARA S-LAH58
11  −10.490  0.60  1.62588  35.70  0.5893  OHARA S-TIM1

12 36.982 0.92
13* −18.000 1.00 1.90270 31.00 0.5943 OHARA L-LAH86
14* −30.642 14.896
15 ∞ 1.40 1.51633 64.14 various filters
16 ∞

(Aspherical Surface Data in Example 1)

Data on aspherical surfaces (surfaces of surface numbers with "*" mark") are as follows.

Aspherical Surface; Seventh Surface
K=0.0, $A_4$=−1.56039×10$^{-4}$, $A_6$=−7.36942×10$^{-7}$, $A_8$=−1.50428×10$^{-1}$ Aspherical Surface; Eighth Surface
K=0.0, $A_4$=1.69456×10$^5$, $A_6$=−1.07652×10$^{-6}$ Aspherical Surface; Thirteenth Surface
K=0.0, $A_4$=3.47223×10$^{-4}$, $A_6$=−6.44790×10$^{-6}$ Aspherical Surface; Fourteenth Surface
K=0.0, $A_4$=4.12542×10$^{-4}$, $A_6$=−3.95877×10$^{-6}$, $A_8$=−2.65584×10$^{-8}$, $A_{10}$=1.00641×10$^{-9}$ (Parameter Values of Conditional Expressions in Example 1)

The parameter values of the respective conditional expressions are as follows.

$L/f = 1.327$ (1)

$D_T/f = 0.673$ (2)

$f_{1P}/f = 1.078$ (3)

$r_{1F}/f = 0.408$ (4)

$r_{1F}/r_{1R} = 0.997$ (5)

$f_4/f_1 = 0.045$ (6)

$f_{1-2}/f_{3-4} = 0.372$ (7)

$r_{2F}/f = -0.866$ (8)

$Y'/f = 0.546$ (9)

$\tan(\theta P_{max}) = 0.691$ (10)

$r_{3F}/r_{2R} = -1.347$ (11)

$r_{3R}/f = 1.423$ (12)

$r_{4R}/f = -0.7$ (13)

$r_{4F}/f = -0.693$ (14)

$nd_{1P} = 1.835$ (15)

$nd_{2P} = 1.832$ (16)

Example 2

Figure 2:
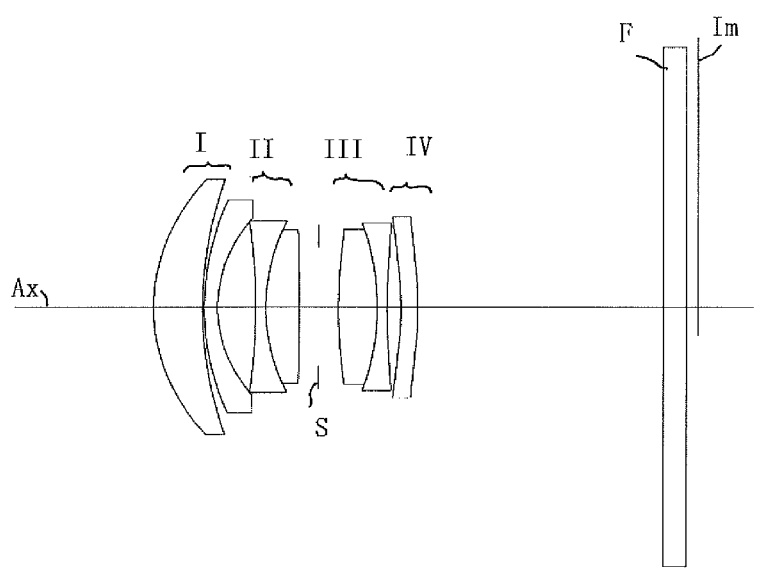
FIG. 2 is a cross-sectional view illustrating a configuration of an imaging lens according to Example 2.

Example 2 has the lens configuration illustrated in FIG. 2.
(Table 2)
f=26.05, F=2.87, ω=28.3
Surface No. R D $N_d$ $v_d$ $P_{g,F}$ Glass name
01* 10.017 2.97 1.83220 40.10 0.5714 OHARA L-LAH90
02 21.619 0.10
03 14.655 0.80 1.78470 26.29 0.6135 OHARA S-TIH23
04 7.523 2.30
05 −34.143 0.60 1.64769 33.79 0.5938 OHARA S-TIM22
06 10.509 2.03 1.88300 40.76 0.5667 OHARA S-LAH58
07 −198.626 1.20
08 stop 1.21
09 31.757 2.26 1.88300 40.76 0.5667 OHARA S-LAH58
10 −13.329 0.60 1.62588 35.70 0.5893 OHARA S-TIM1
11 48.214 0.84
12* −18.000 1.00 1.90270 31.00 0.5943 OHARA L-LAH86
13* −20.113 14.890
14 ∞ 1.40 1.51633 64.14 various filters
15 ∞

(Aspherical Surface Data in Example 2)

Data on aspherical surfaces are as follows.

Aspherical Surface; First Surface
K=0.0, $A_4$=−3.54224×10$^{-5}$, $A_6$=−4.66804×10$^{-8}$, $A_8$=−1.10660×10$^{-8}$, $A_{10}$=8.24552×10$^{-11}$, $A_{12}$=−1.19318×10$^{-12}$ Aspherical Surface; Twelfth Surface
K=0.0, $A_4$=3.45703×10$^{-4}$ Aspherical Surface; Thirteenth Surface
K=0.0, $A_4$=3.69614×10$^{-4}$, $A_6$=−4.24378×10$^{-7}$, $A_8$=5.77254×10$^{-8}$, $A_{10}$=−1.22381×10$^{-9}$ (Parameter Values of Conditional Expressions in Example 2)

The parameter values of the respective conditional expressions are as follows.

$L/f = 1.267$ (1)

$D_T/f = 0.614$ (2)

$f_{1P}/f = 0.771$ (3)

$r_{1F}/f = 0.384$ (4)

$r_{1F}/r_{1R} = 1.332$ (5)

$f_4/f_1 = -2.589$ (6)

$f_{1-2}/f_{3-4} = 1.760$ (7)

$r_{2F}/f = -1.310$ (8)

$Y'/f = 0.545$ (9)

$\tan(\theta P_{max}) = 0.682$ (10)

$r_{3F}/r_{2R} = -0.160$ (11)

$r_{3R}/f = 1.850$ (12)

$r_{4R}/f = -0.772$ (13)

$r_{4F}/f = -0.691$ (14)

$nd_{1P} = 1.832$ (15)

$nd_{2P} = 1.883$ (16)

Example 3

Figure 3:
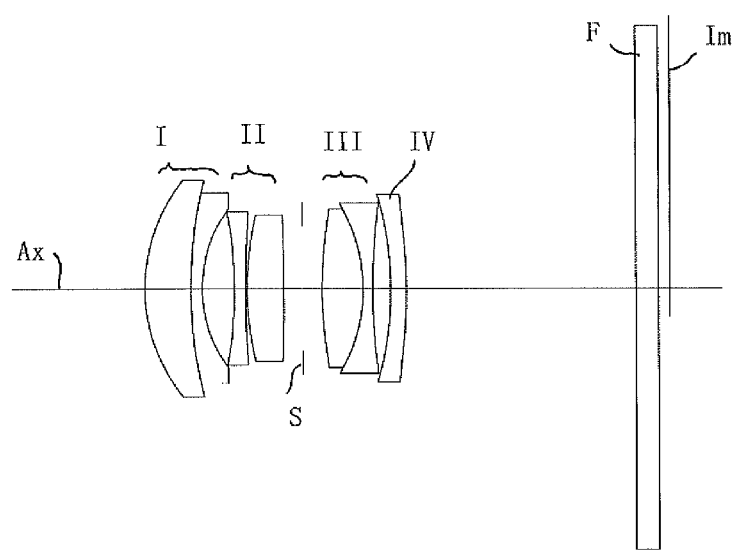
FIG. 3 is a cross-sectional view illustrating a configuration of an imaging lens according to Example 3.

Example 3 has the lens configuration illustrated in FIG. 3.
(Table 3)
f=26.05, F=2.87, ω=28.3
Surface No. R D $N_d$ $v_d$ $P_{g,F}$ Glass name
01* 9.247 2.91 1.85400 40.38 0.5688 OHARA L-LAH85V
0 224.908 0.70 1.78880 28.43 0.6009 OHARA S-NBH58
03 7.360 2.01
04 −22.769 0.70 1.63980 34.47 0.5922 OHARA S-TIM27
05 61.496 0.10
06 17.395 2.32 1.88300 40.76 0.5667 OHARA S-LAH58
07 −113.651 1.20
08 stop 1.20
09 24.522 2.57 1.75500 52.32 0.5667 OHARA S-LAH58

10 −9.139 0.60 1.53172 48.84 0.5631 OHARA S-TIL6
11 33.044 1.15
12* −18.000 1.00 1.90270 31.00 0.5943 OHARA L-LAH86
13* −26.676 14.378
14 ∞ 1.40 1.51633 64.14 various filters
15 ∞

(Aspherical Surface Data in Example 3)
Data on aspherical surfaces are as follows.
Aspherical Surface; First Surface
$K=0.0$, $A_4=-2.63557\times10^{-5}$, $A_6=-6.86204\times10^{-7}$, $A_8=9.51319\times10^{-9}$, $A_{10}=-2.99238\times10^{-10}$
Aspherical Surface; Thirteenth Surface
$K=0.0$, $A_4=1.30975\times10^{-4}$, $A_6=-3.75252\times10^{-7}$, $A_8=5.96446\times10^{-8}$, $A_{10}=-8.12812\times10^{-10}$ (Parameter Values of Conditional Expressions in Example 3)
The parameter values of the respective conditional expressions are as follows.

$$L/f=1.264 \tag{1}$$

$$D_T/f=0.632 \tag{2}$$

$$f_{1P}/f=0.609 \tag{3}$$

$$r_{1F}/f=0.335 \tag{4}$$

$$r_{1F}/r_{1R}=1.256 \tag{5}$$

$$f_4/f_1=0.146 \tag{6}$$

$$f_{1-2}/f_{3-4}=1.296 \tag{7}$$

$$r_{2F}/f=-0.874 \tag{8}$$

$$Y'/f=0.545 \tag{9}$$

$$\tan(\theta P_{max})=0.672 \tag{10}$$

$$r_{3F}/r_{2R}=-0.216 \tag{11}$$

$$r_{3R}/f=1.268 \tag{12}$$

$$r_{4R}/f=-1.024 \tag{13}$$

$$r_{4F}/f=-0.691 \tag{14}$$

$$nd_{1P}=1.834 \tag{15}$$

$$nd_{2P}=1.833 \tag{16}$$

Example 4

Figure 4:
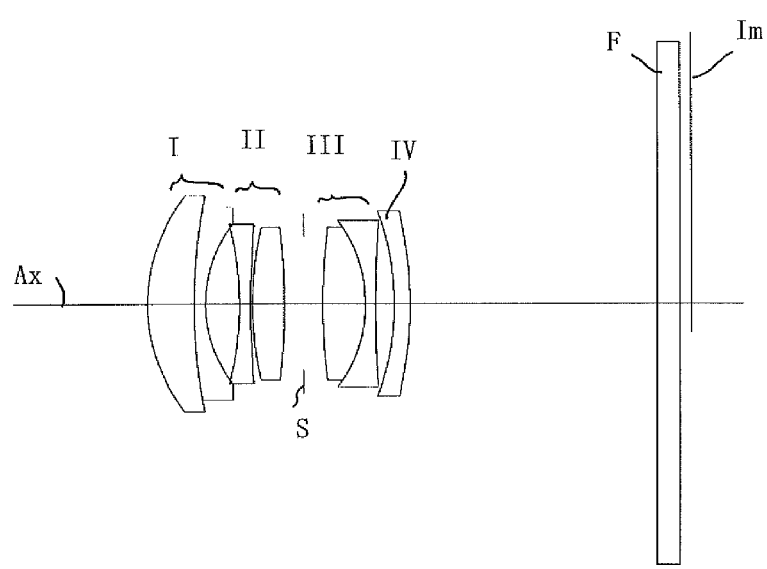
FIG. 4 is a cross-sectional view illustrating a configuration of an imaging lens according to Example 4.

Example 4 has the lens configuration illustrated in FIG. 4.
(Table 4)
f=28.00, F=2.88, ω=26.6
Surface No. R D $N_d$ $v_d$ $P_{g,F}$ Glass name
01* 9.447 2.95 1.85400 40.38 0.5688 OHARA L-LAH85V
02 30.602 0.70 1.74077 27.79 0.6095 OHARA S-TIH13
03 7.393 2.11
04 −18.010 0.70 1.60342 38.03 0.5922 OHARA S-TIM5
05 56.812 0.10
06 18.661 2.01 1.83481 42.74 0.5648 OHARA S-LAH55VS
07 −35.218 1.22
08 stop 1.20
09 34.107 2.70 1.65160 58.55 0.5425 OHARA S-LAL7
10 −7.705 0.60 1.51823 58.90 0.5457 OHARA S-NSL3
11 59.118 1.19
12 −14.554 1.00 1.90270 31.00 0.5943 OHARA L-LAH86
13* −19.650 15.508
14 ∞ 1.40 1.51633 64.14 various filters
15 ∞

(Aspherical Surface Data in Example 4)
Data on aspherical surfaces are as follows.
Aspherical Surface; First Surface
$K=0.0$, $A_4=-2.52197\times10^{-5}$, $A_6=-7.06205\times10^{-7}$, $A_8=1.01999\times10^{-8}$, $A_{10}=-2.76954\times10^{-10}$
Aspherical Surface; Thirteenth Surface
$K=0.0$, $A_4=9.97548\times10^{-5}$, $A_6=-2.74503\times10^{-7}$, $A_8=4.05280\times10^{-8}$, $A_{10}=-4.40120\times10^{-10}$ (Parameter Values of Conditional Expressions in Example 4)
The parameter values of the respective conditional expressions are as follows.

$$L/f=1.217 \tag{1}$$

$$D_T/f=0.589 \tag{2}$$

$$f_{1P}/f=0.537 \tag{3}$$

$$r_{1F}/f=0.337 \tag{4}$$

$$r_{1F}/r_{1R}=1.278 \tag{5}$$

$$f_4/f_1=0.296 \tag{6}$$

$$f_{1-2}/f_{3-4}=0.530 \tag{7}$$

$$r_{2F}/f=-0.643 \tag{8}$$

$$Y'/f=0.507 \tag{9}$$

$$\tan(\theta P_{max})=0.629 \tag{10}$$

$$r_{3F}/r_{2R}=-0.968 \tag{11}$$

$$r_{3R}/f=2.111 \tag{12}$$

$$r_{4R}/f=-0.702 \tag{13}$$

$$r_{4F}/f=-0.520 \tag{14}$$

$$nd_{1P}=1.854 \tag{15}$$

$$nd_{2P}=1.835 \tag{16}$$

Example 5

Figure 5:
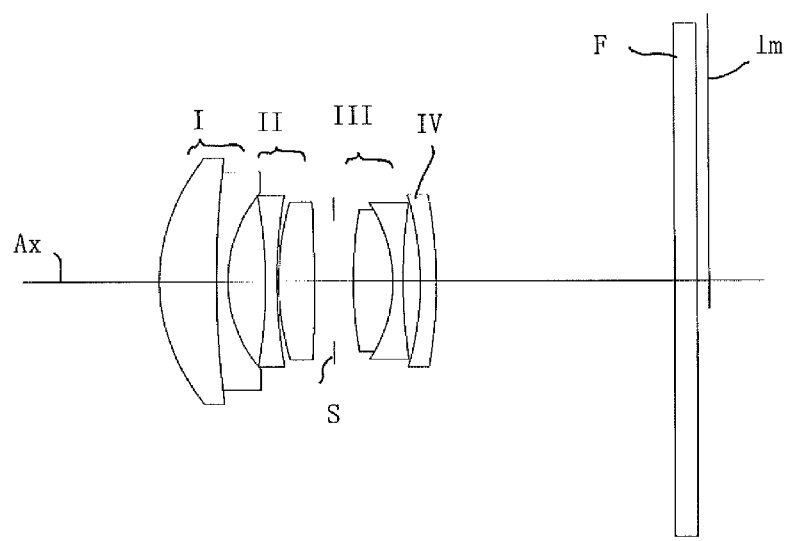
FIG. 5 is a cross-sectional view illustrating a configuration of an imaging lens according to Example 5.

Example 5 has the lens configuration illustrated in FIG. 5.
(Table 5)
f=26.05, F=2.88, ω=28.3
Surface No. R D $N_d$ $v_d$ $P_{g,F}$ Glass name
01* 10.626 3.50 1.85400 40.38 0.5688 OHARA L-LAH85V
02 55.319 0.70 1.72825 28.46 0.6077 OHARA S-TIH10
03 7.914 2.33
04 −28.150 0.70 1.64769 33.79 0.5938 OHARA S-TIM22
05 28.150 0.10
06 16.113 2.22 1.90525 35.04 0.5848 OHARA S-LAH93
07 −94.335 1.20
08 stop 1.20
09 25.481 2.42 1.72916 54.09 0.5448 OHARA S-LAL19
10 −8.325 0.60 1.54814 45.78 0.6030 OHARA S-TIM35
11 31.988 1.04
12 −18.000 1.00 1.90270 31.00 0.5943 OHARA L-LAH86
13* −22.450 14.638

14 ∞ 1.40 1.51633 64.14 various filters
15 ∞

(Aspherical Surface Data in Example 5)
Data on aspherical surfaces are as follows.
Aspherical Surface; First Surface
  $K=0.0$, $A_4=-2.62422\times10^{-5}$, $A_6=-4.81459\times10^{-7}$, $A_8=3.20423\times10^{-9}$, $A_{10}=-1.16410\times10^{-10}$
Aspherical Surface; Thirteenth Surface
  $K=0.0$, $A_4=1.22749\times10^{-4}$, $A_6=-2.98756\times10^{-7}$, $A_8=6.89210\times10^{-1}$, $A_{10}=-9.94935\times10^{-10}$ (Parameter Values of Conditional Expressions in Example 5)
The parameter values of the respective conditional expressions are as follows.

$L/f=1.295$ (1)

$D_T/f=0.653$ (2)

$f_{1P}/f=0.574$ (3)

$r_{1F}/f=0.408$ (4)

$r_{1F}/r_{1R}=1.343$ (5)

$f_4/f_1=-0.372$ (6)

$f_{1-2}/f_{3-4}=1.252$ (7)

$r_{2F}/f=-1.080$ (8)

$Y'/f=0.545$ (9)

$\tan(\theta P_{max})=0.688$ (10)

$r_{3F}/r_{2R}=-0.270$ (11)

$r_{3R}/f=1.228$ (12)

$r_{4R}/f=-0.862$ (13)

$r_{4F}/f=-0.691$ (14)

$nd_{1P}=1.854$ (15)

$nd_{2P}=1.905$ (16)

Example 6

Figure 6:
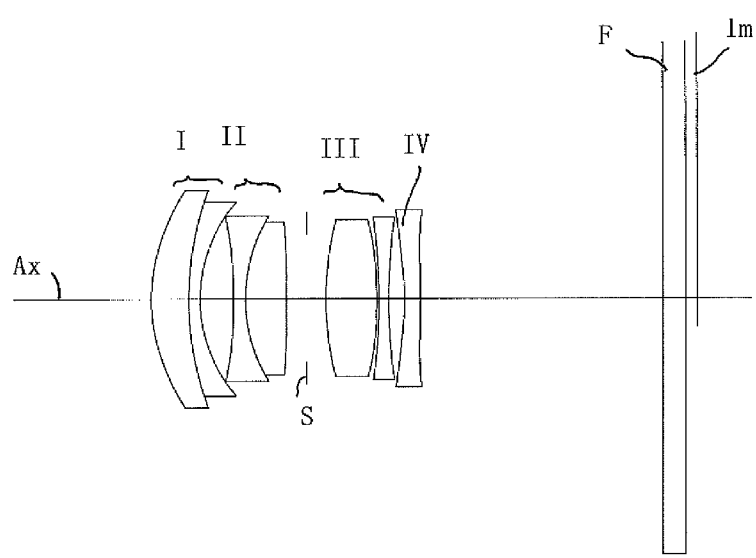
FIG. 6 is a cross-sectional view illustrating a configuration of an imaging lens according to Example 6.

Example 6 has the lens configuration illustrated in FIG. 6.
(Table 6)
f=24.68, F=2.88, ω=29.6
Surface No. R D $N_d$ $v_d$ $P_{g,F}$ Glass name
01* 10.669 2.30 1.82080 42.71 0.5642 HOYA M-TAFD51
02 18.250 0.70 1.67300 38.15 0.5757 OHARA S-NBH52V
03 8.706 2.08
04 −24.184 0.70 1.67270 32.10 0.5988 OHARA S-TIM25
05 9.234 2.54 1.88300 40.69 0.5673 HIKARI J-LASF08A
06 −65.279 1.20
07 stop 1.20
08 18.050 3.15 1.88300 40.69 0.5673 HIKARI J-LASF08A
09 −20.928 0.10
10 −35.679 0.60 1.68893 31.07 0.6004 OHARA S-TIM28
11 35.679 0.94
12* −17.345 1.00 1.68893 31.16 0.6037 HOYA M-FD80
13* −37.142 14.893
14 ∞ 1.40 1.51633 64.14 various filters
15 ∞

(Aspherical Surface Data in Example 6)
Data on aspherical surfaces are as follows.
Aspherical Surface; First Surface
  $K=0.0$, $A_4=-3.29990\times10^5$, $A_6=-6.63571E\times10^{-7}$, $A_8=3.34066\times10^{-9}$, $A_{10}=-2.16938\times10^{-10}$
Aspherical Surface; Twelfth Surface
  $K=0.0$, $A_4=6.59150\times10^{-4}$, $A_6=-9.07297\times10^{-6}$
Aspherical Surface; Thirteenth Surface
  $K=0.0$, $A_4=8.07148\times10^{-4}$, $A_6=-7.24676\times10^{-6}$, $A_8=-1.28617\times10^{-9}$, $A_{10}=1.09784\times10^{-10}$ (Parameter Values of Conditional Expressions in Example 6)
The parameter values of the respective conditional expressions are as follows.

$L/f=1.358$ (1)

$D_T/f=0.669$ (2)

$f_{1P}/f=1.116$ (3)

$r_{1F}/f=0.432$ (4)

$r_{1F}/r_{1R}=1.226$ (5)

$f_4/f_1=-0.100$ (6)

$f_{1-2}/f_{3-4}=3.573$ (7)

$r_{2F}/f=-0.980$ (8)

$Y'/f=0.575$ (9)

$\tan(\theta P_{max})=0.685$ (10)

$r_{3F}/r_{2R}=-0.277$ (11)

$r_{3R}/f=1.446$ (12)

$r_{4R}/f=-1.505$ (13)

$r_{4F}/f=-0.703$ (14)

$nd_{1P}=1.821$ (15)

$nd_{2P}=1.883$ (16)

Example 7

Figure 7:
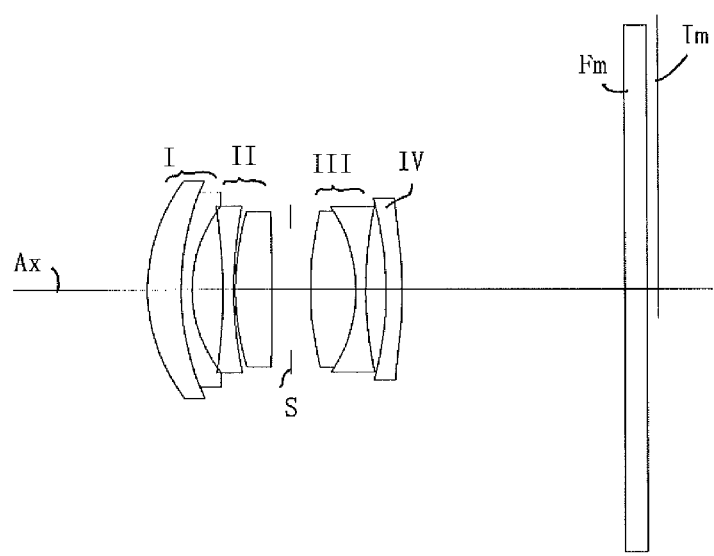
FIG. 7 is a cross-sectional view illustrating a configuration of an imaging lens according to Example 7.

Example 7 has the lens configuration illustrated in FIG. 7.
(Table 7)
f=23.42, F=2.88, ω=30.9
Surface No. R D $N_d$ $v_d$ $P_{g,F}$ Glass name
01* 9.393 2.12 1.82080 42.71 0.5642 HOYA M-TAFD51
02 14.350 0.70 1.69895 30.05 0.6028 HOYA E-FD15
03 7.440 1.92
04 −29.751 0.70 1.64769 33.84 0.5923 HOYA E-FD2
05 22.787 0.10
06 14.677 2.29 1.88300 40.69 0.5673 HIKARI J-LASF08A
07 −191.434 1.20
08 stop 1.20
09 17.856 2.86 1.88100 40.14 0.5701 HOYA TAFD33
10 −8.223 0.60 1.67270 32.17 0.5962 HOYA E-FD5
11 21.102 1.30
12 −18.000 1.00 1.88202 37.22 0.5769 HOYA M-TAFD307
13* −22.111 13.940
14 ∞ 1.40 1.51633 64.14 various filters
15 ∞

(Aspherical Surface Data in Example 7)
Data on aspherical surfaces are as follows.
Aspherical Surface; First Surface
K=0.0, $A_4$=−4.08710×10$^5$, $A_6$=−4.27926×10$^{-7}$, $A_8$=−1.04734×10$^{-8}$, $A_{10}$=−1.48266×10$^{-10}$
Aspherical Surface; Thirteenth Surface
K=0.0, $A_4$=1.88752×10$^{-4}$, $A_6$=9.04904×10$^{-7}$, $A_8$=8.62046×10$^{-8}$, $A_{10}$=−1.22399×10$^{-9}$ (Parameter Values of Conditional Expressions in Example 7)
The parameter values of the respective conditional expressions are as follows.

$L/f$=1.368 (1)

$D_T/f$=0.683 (2)

$f_{1P}/f$=1.186 (3)

$r_{1F}/f$=0.401 (4)

$r_{1F}/r_{1R}$=1.263 (5)

$f_4/f_1$=0.191 (6)

$f_{1-2}/f_{3-4}$=3.114 (7)

$r_{2F}/f$=−1.270 (8)

$Y'/f$=0.606 (9)

$\tan(\theta P_{max})$=0.703 (10)

$r_{3F}/r_{2R}$=−0.093 (11)

$r_{3R}/f$=0.901 (12)

$r_{4R}/f$=−0.944 (13)

$r_{4F}/f$=−0.769 (14)

$nd_{1P}$=1.821 (15)

$nd_{2P}$=1.883 (16)

Example 8

Figure 8:
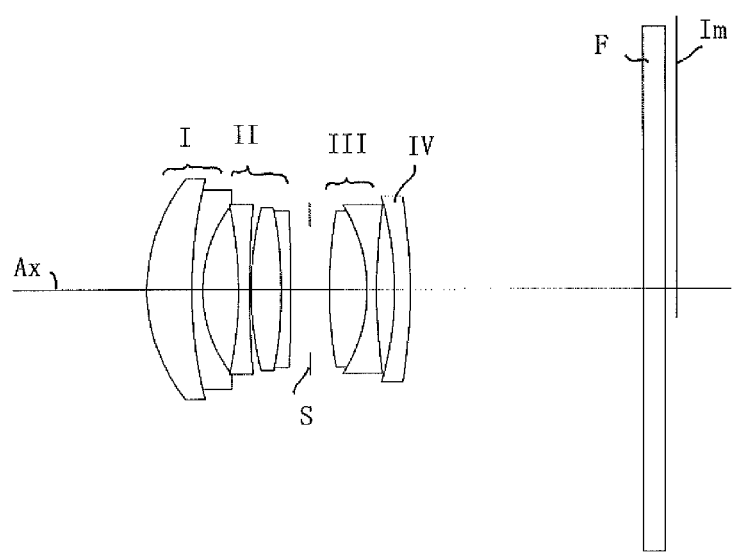
FIG. 8 is a cross-sectional view illustrating a configuration of an imaging lens according to Example 8.

Example 8 has the lens configuration illustrated in FIG. 8.
(Table 8)
f=26.04, F=2.88, ω=28.3
Surface No. R D $N_d$ $\nu_d$ $P_{g,F}$ Glass name
01* 9.572 2.78 1.85400 40.38 0.5688 OHARA L-LAH85V
02 24.829 0.70 1.78880 28.43 0.6009 OHARA S-NBH58
03 7.822 2.23
04 −22.140 0.70 1.56732 42.82 0.5731 OHARA S-TIL26
05 53.236 0.10
06 18.531 1.89 1.88300 40.76 0.5667 OHARA S-LAH58
07 −24.000 0.60 1.80000 29.84 0.6017 OHARA S-NBH55
08 −116.418 1.20
09 stop 1.20
10 12.474 2.36 1.74100 52.64 0.5467 OHARA S-LAL61
11 −8.112 0.60 1.54072 47.23 0.5651 OHARA S-TIL2
12 11.685 1.14
13 −17.538 1.00 1.86100 37.10 0.5785 OHARA L-LAH94
14* −19.900 14.581
15 ∞ 1.40 1.51633 64.14 various filters
16 ∞

(Aspherical Surface Data in Example 8)
Data on aspherical surfaces are as follows.
Aspherical Surface; First Surface
K=0.0, $A_4$=−2.62065×10$^{-5}$, $A_6$=−5.73136×10$^{-7}$, $A_8$=5.83843×10$^{-9}$, $A_{10}$=−2.15266×10$^{-10}$
Aspherical Surface; Fourteenth Surface
K=0.0, $A_4$=1.29178×10$^{-4}$, $A_6$=−4.77236×10$^{-7}$, $A_8$=6.42635−10$^{-8}$, $A_{10}$=−9.22759×10$^{-10}$ (Parameter Values of Conditional Expressions in Example 8)
The parameter values of the respective conditional expressions are as follows.

$L/f$=1.274 (1)

$D_T/f$=0.634 (2)

$f_{1P}/f$=0.646 (3)

$r_{1F}/f$=0.368 (4)

$r_{1F}/r_{1R}$=1.224 (5)

$f_4/f_1$−=0.232 (6)

$f_{1-2}/f_{3-4}$=1.023 (7)

$r_{2F}/f$=−0.850 (8)

$Y'/f$=0.545 (9)

$\tan(\theta P_{max})$=0.665 (10)

$r_{3F}/r_{2R}$=−0.224 (11)

$r_{3R}/f$=1.239 (12)

$r_{4R}/f$=−0.975 (13)

$r_{4F}/f$=−0.691 (14)

$nd_{1P}$=1.854 (15)

$nd_{2P}$=1.883 (16)

Example 9

Figure 9:
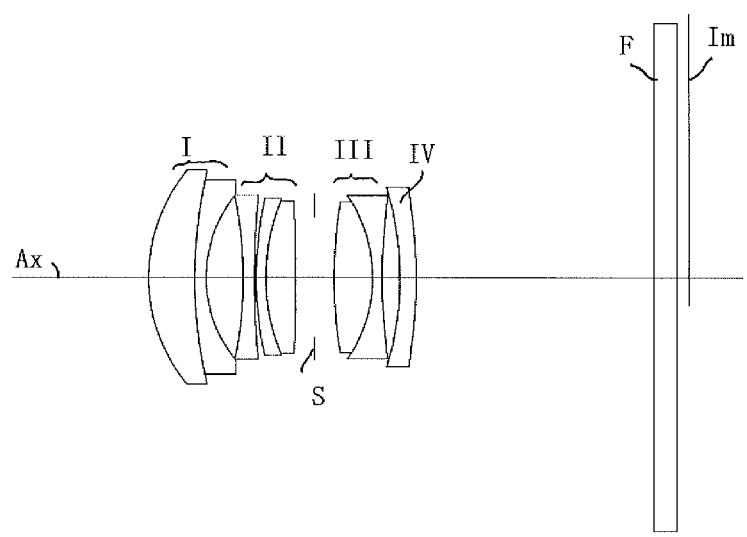
FIG. 9 is a cross-sectional view illustrating a configuration of an imaging lens according to Example 9.

Example 9 has the lens configuration illustrated in FIG. 9.
(Table 9)
f=26.06, F=2.88, ω=28.3
Surface No. R D $N_d$ $\nu_d$ $P_{g,F}$ Glass name
01* 9.718 2.85 1.85400 40.38 0.5688 OHARA L-LAH85V
02 28.191 0.70 1.78880 28.43 0.6009 OHARA S-NBH58
03 7.936 2.26
04 −23.765 0.70 1.56732 42.82 0.5731 OHARA S-TIL26
05 55.698 0.10
06 20.822 0.60 1.68893 31.07 0.6004 OHARA S-TIM28
07 11.777 1.83 1.88300 40.76 0.5667 OHARA S-LAH58
08 −139.566 1.20
09 stop 1.20
10 27.121 2.36 1.73400 51.47 0.5486 OHARA S-LAL59
11 −8.707 0.60 1.54814 45.78 0.5686 OHARA S-TIL1
12 36.884 1.10
13 −18.000 1.00 1.86100 37.10 0.5785 OHARA L-LAH94
14* −25.049 14.581
15 ∞ 1.40 1.51633 64.14 various filters
16 ∞

(Aspherical Surface Data in Example 9)
Data on aspherical surfaces are as follows.
Aspherical Surface; First Surface
$K=0.0$, $A_4=-2.46254\times10^{-5}$, $A_6=-5.56469\times10^{-7}$, $A_8=5.71488\times10^{-9}$, $A_{10}=-1.90619\times10^{-10}$
Aspherical Surface; Fourteenth Surface
$K=0.0$, $A_4=1.30813\times10^{-4}$, $A_6=-3.50965\times10^{-7}$, $A_8=5.51796\times10^{-8}$, $A_{10}=-7.69857\times10^{-10}$
(Parameter Values of Conditional Expressions in Example 9)
The parameter values of the respective conditional expressions are as follows.

$L/f=1.276$ (1)

$D_T/f=0.633$ (2)

$f_{1P}/f=0.622$ (3)

$r_{1F}/f=0.373$ (4)

$r_{1F}/r_{1R}=1.225$ (5)

$f_4/f_1=-0.258$ (6)

$f_{1-2}/f_{3-4}=0.998$ (7)

$r_{2F}/f=-0.912$ (8)

$Y'/f=0.545$ (9)

$\tan(\theta P_{max})=0.663$ (10)

$r_{3F}/r_{2R}=-0.194$ (11)

$r_{3R}/f=1.416$ (12)

$r_{4R}/f=-0.961$ (13)

$r_{4F}/f=-0.691$ (14)

$nd_{1P}=1.854$ (15)

$nd_{2P}=1.883$ (16)

Example 10

Figure 10:
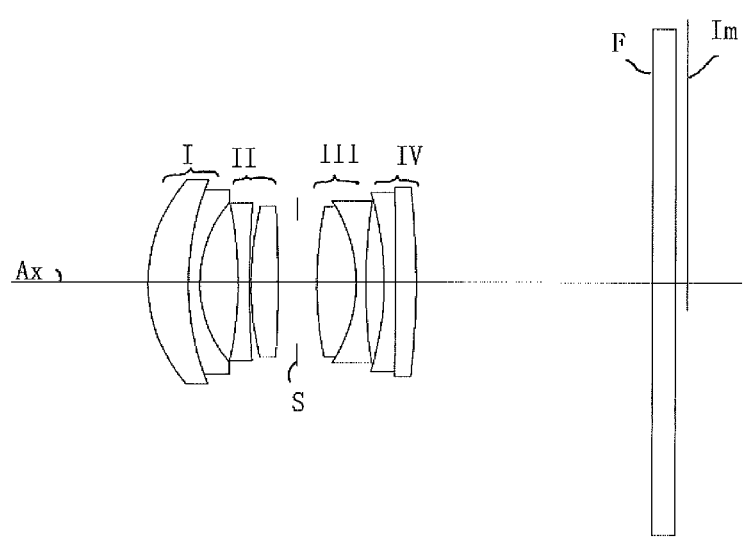
FIG. 10 is a cross-sectional view illustrating a configuration of an imaging lens according to Example 10.
Figure 11:
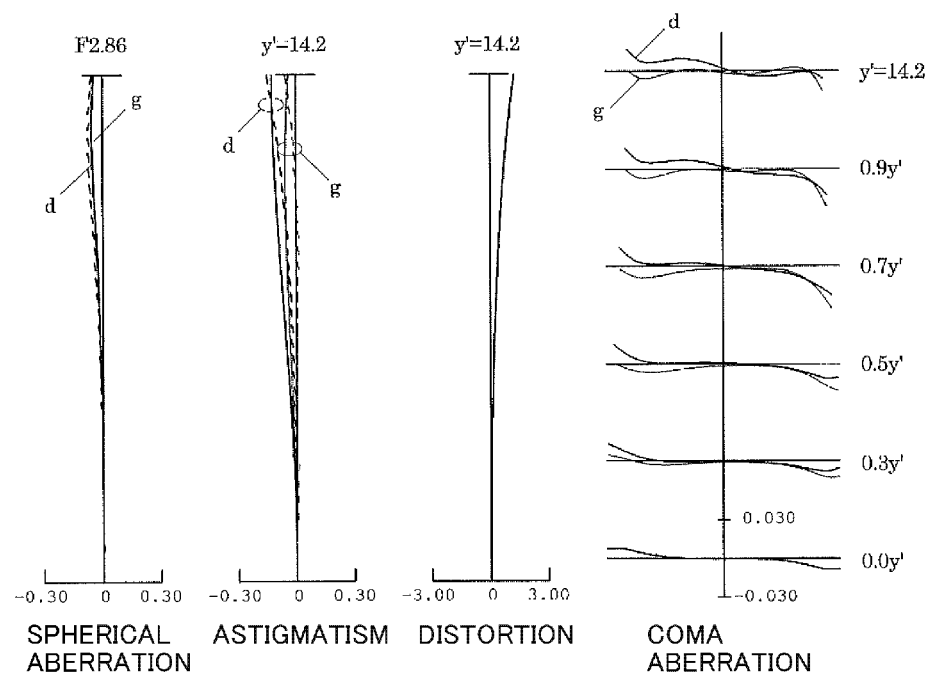
FIG. 11 includes aberration curve diagrams of the imaging lens according to Example 1.
Figure 12:
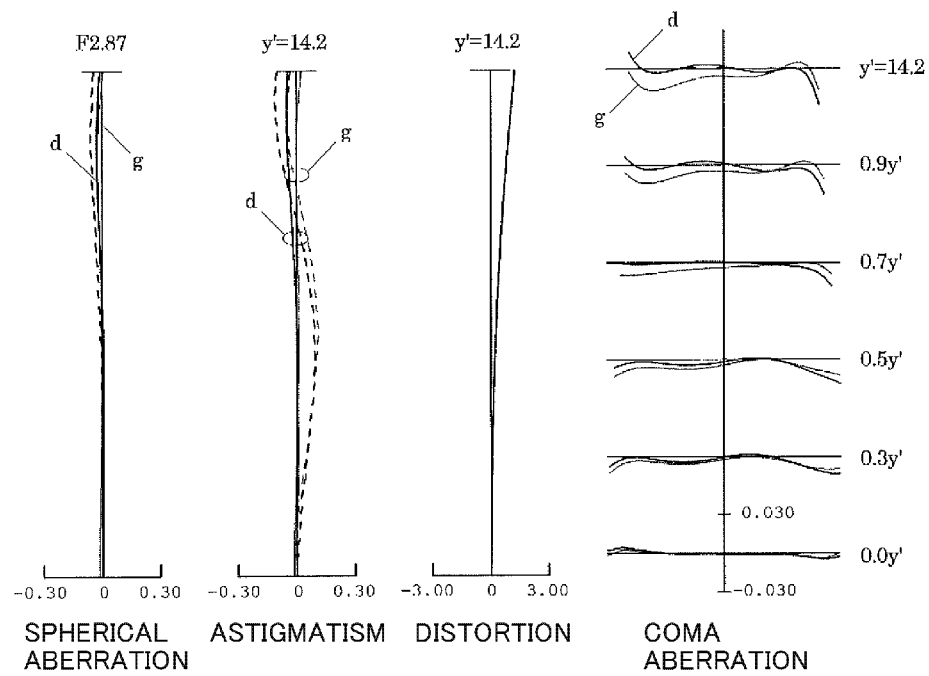
FIG. 12 includes aberration curve diagrams of the imaging lens according to Example 2.
Figure 13:
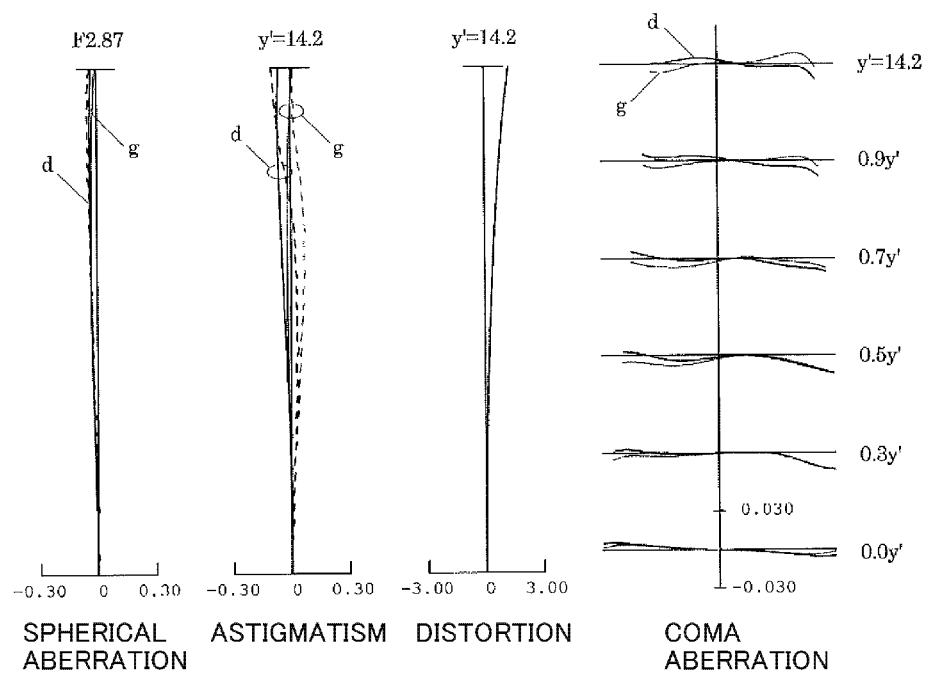
FIG. 13 includes aberration curve diagrams of the imaging lens according to Example 3.
Figure 14:
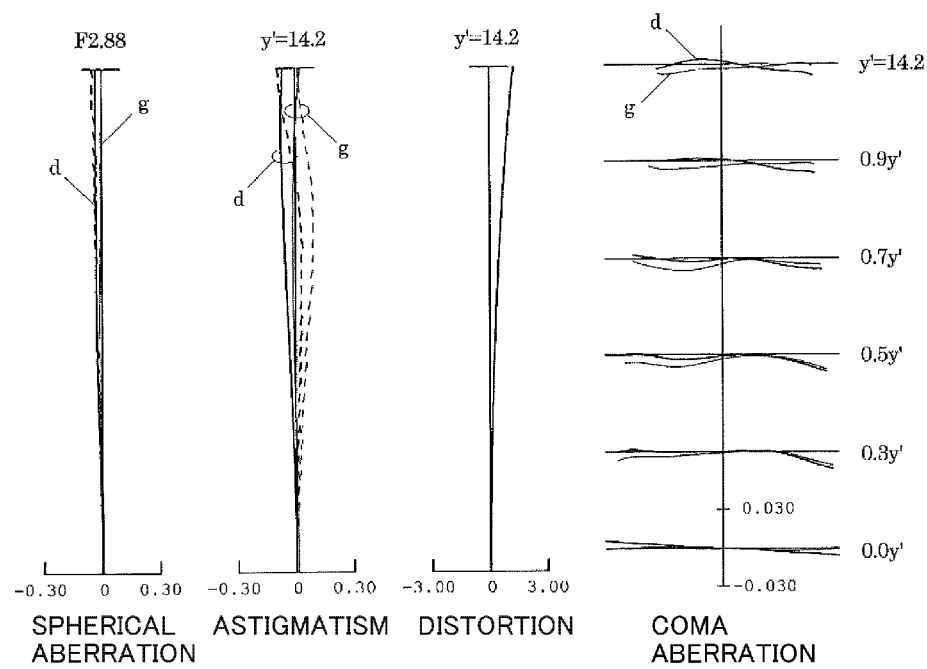
FIG. 14 includes aberration curve diagrams of the imaging lens according to Example 4.
Figure 15:
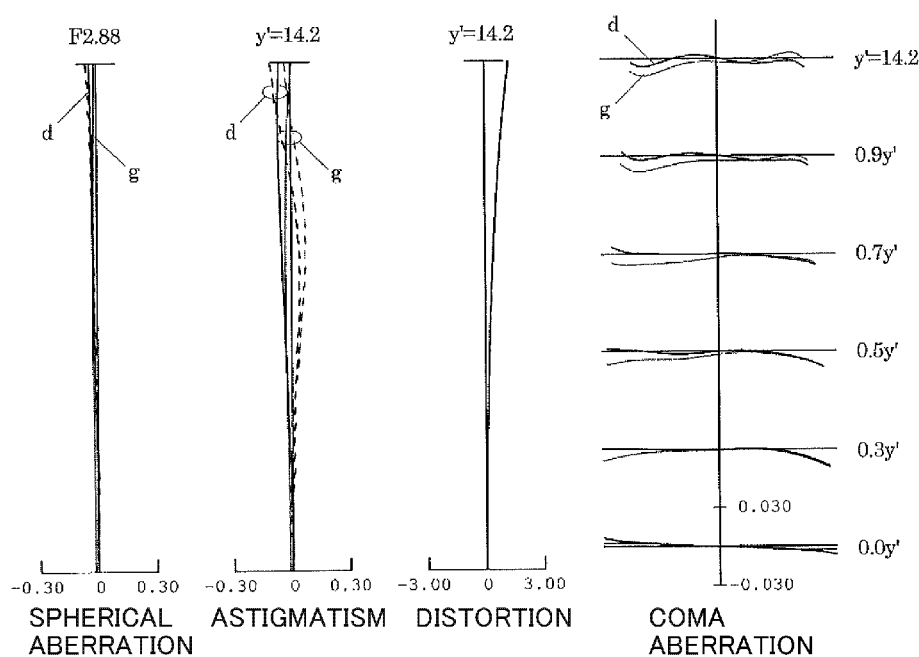
FIG. 15 includes aberration curve diagrams of the imaging lens according to Example 5.
Figure 16:
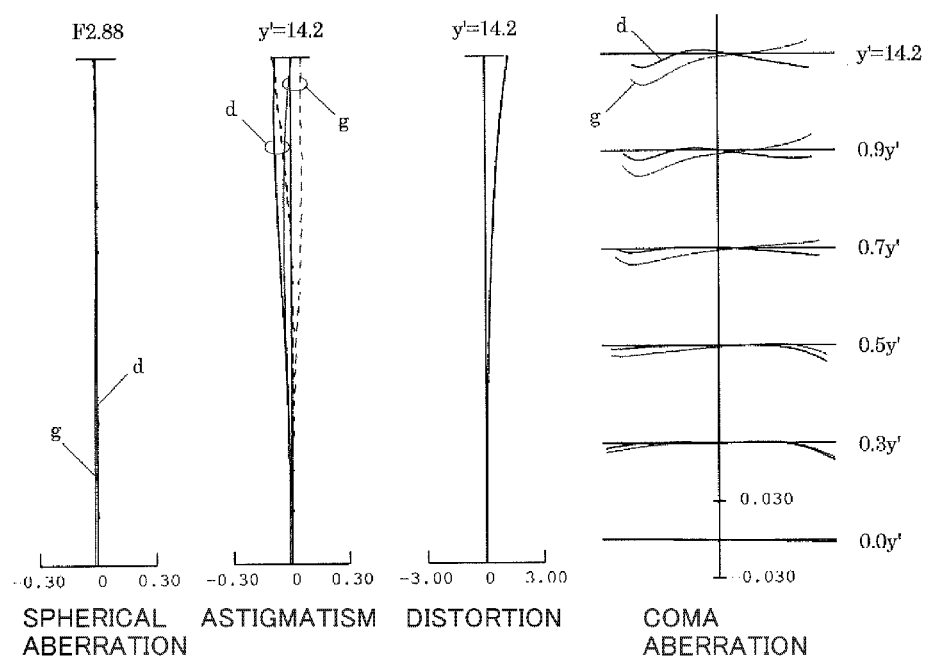
FIG. 16 includes aberration curve diagrams of the imaging lens according to Example 6.
Figure 17:
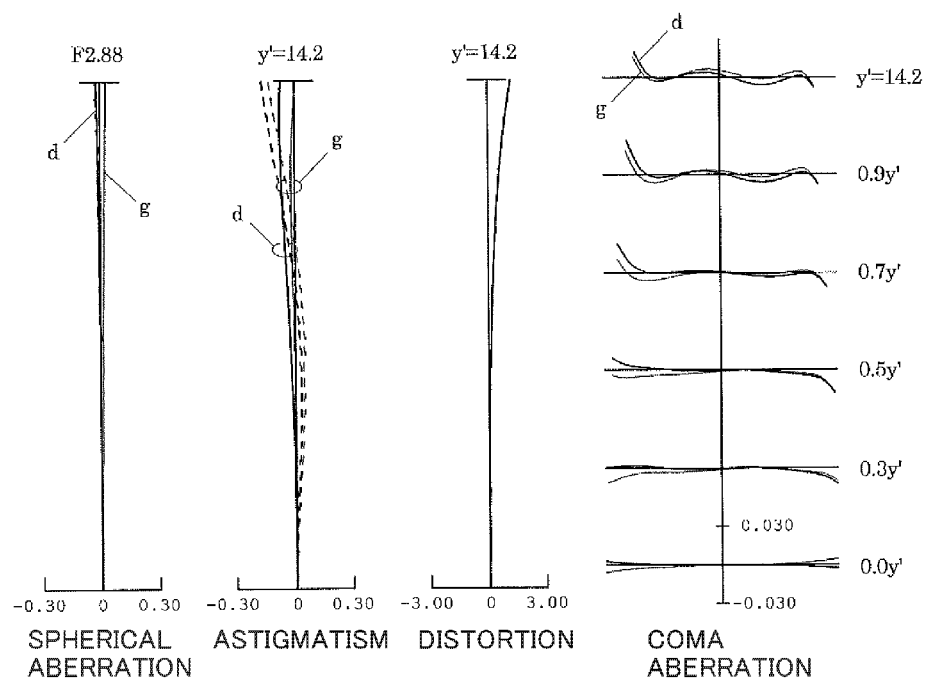
FIG. 17 includes aberration curve diagrams of the imaging lens according to Example 7.
Figure 18:
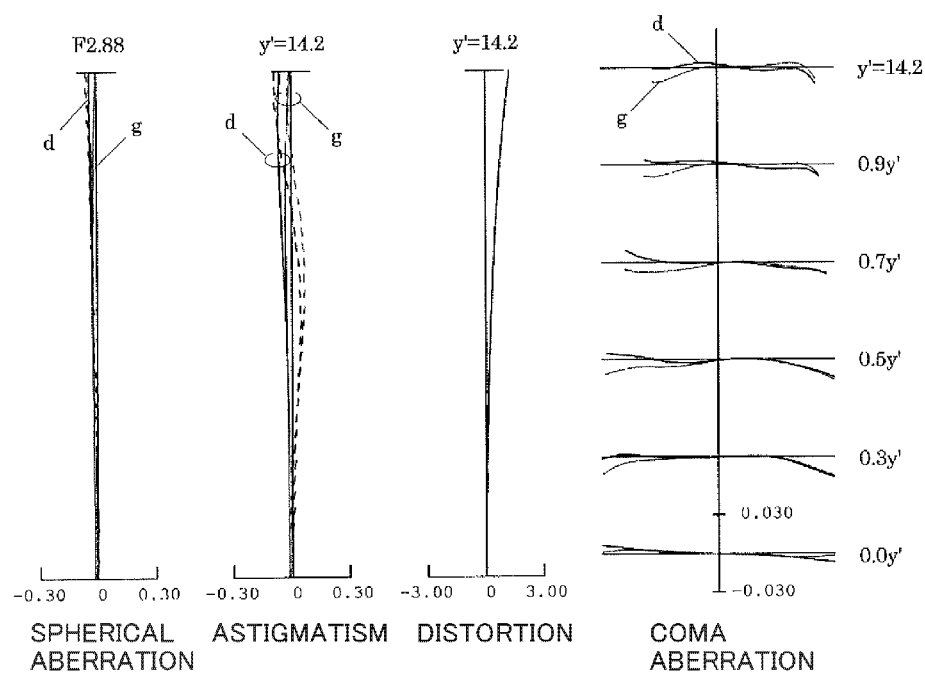
FIG. 18 includes aberration curve diagrams of the imaging lens according to Example 8.
Figure 19:
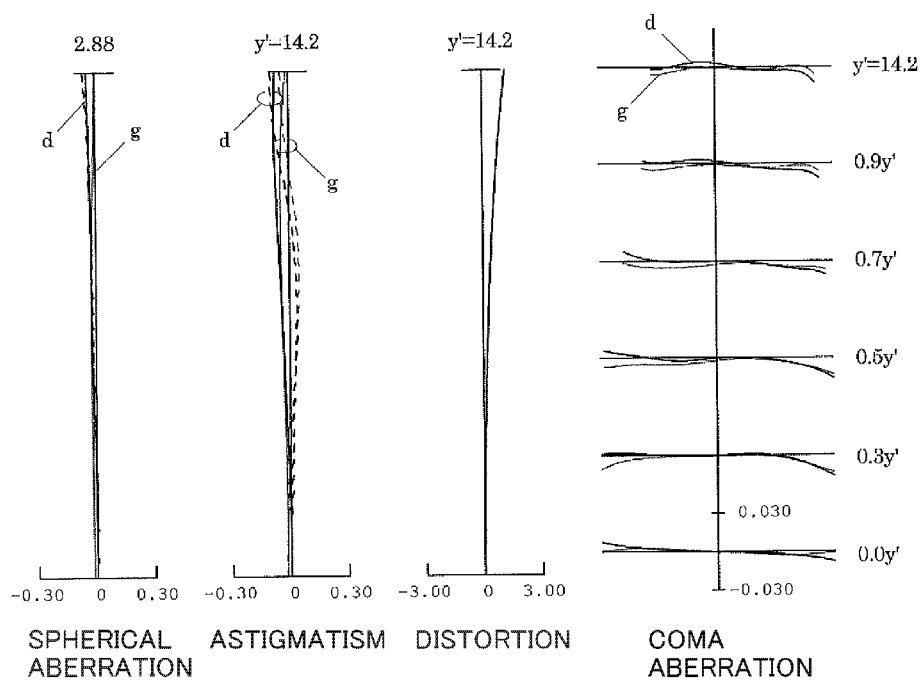
FIG. 19 includes aberration curve diagrams of the imaging lens according to Example 9.
Figure 20:
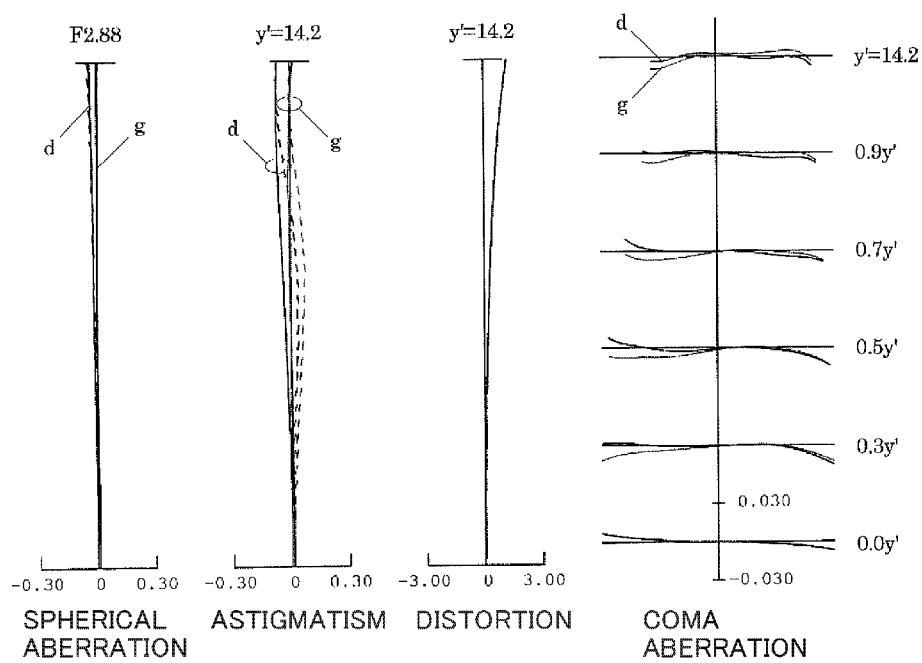
FIG. 20 includes aberration curve diagrams of the imaging lens according to Example 10.

Example 10 has the lens configuration illustrated in FIG. 10.
(Table 10)
f=26.05, F=2.88, ω=28.3
Surface No. R D $N_d$ $v_d$ $P_{g,F}$ Glass name
01* 9.067 2.47 1.85400 40.38 0.5688 OHARA L-LAH85V
02 16.326 0.70 1.76182 26.52 0.6136 OHARA S-TIH14
03 7.495 2.33
04 −22.619 0.70 1.63980 34.47 0.5922 OHARA S-TIM27
05 60.949 0.10
06 19.213 1.68 1.88300 40.69 0.5673 HIKARI J-LASF08A
07 −77.308 1.20
08 stop 1.20
09 23.071 2.42 1.72000 50.23 0.5521 OHARA S-LAL10
10 −8.936 0.60 1.54814 45.78 0.5686 OHARA S-TIL1
11 34.120 1.12
12 −18.290 0.70 1.67270 32.17 0.5962 HOYA E-FD5
13 −897.000 1.29 1.88202 37.22 0.5769 HOYA M-TAFD307
14* −35.676 14.581
15 ∞ 1.40 1.51633 64.14 various filters
16 ∞

(Aspherical Surface Data in Example 10)
Data on aspherical surfaces are as follows.
Aspherical Surface; First Surface
$K=0.0$, $A_4=-2.57013\times10^5$, $A_6=-5.79335\times10^{-7}$, $A_8=5.88906\times10^{-9}$, $A_{10}=-2.51234\times10^{-10}$
Aspherical Surface; Fourteenth Surface
$K=0.0$, $A_4=1.20805\times10^{-4}$, $A_6=-1.48753\times10^{-7}$, $A_8=3.11246\times10^{-9}$, $A_{10}=-3.68347\times10^{-10}$
(Parameter Values of Conditional Expressions in Example 10)
The parameter values of the respective conditional expressions are as follows.

$L/f=1.273$ (1)

$D_T/f=0.634$ (2)

$f_{1P}/f=0.792$ (3)

$r_{1F}/f=0.348$ (4)

$r_{1F}/r_{1R}=1.210$ (5)

$f_4/f_1=-0.351$ (6)

$f_{1-2}/f_{3-4}=1.183$ (7)

$r_{2F}/f=-0.868$ (8)

$Y'/f=0.545$ (9)

$\tan(\theta P_{max})=0.650$ (10)

$r_{3F}/r_{2R}=-0.298$ (11)

$r_{3R}/f=1.310$ (12)

$r_{4R}/f=-1.370$ (13)

$r_{4F}/f=-0.702$ (14)

$nd_{1P}=1.854$ (15)

$nd_{2P}=1.883$ (16)

Among Example 1 to Example 10, the refractive power of the first lens group is "negative" in Example 1 and Example 7, and is "positive" in the other examples. FIGS. 11 to 20 sequentially illustrate the aberration diagrams (diagrams for spherical aberration, distortion, astigmatism, and coma aberration) relating to Example 1 to Example 10.

A broken line in each diagram for spherical aberration indicates "sine condition". A solid line in each diagram for astigmatism indicates "sagittal" and a broken line in the diagram indicates "meridional".

As illustrated in the respective aberration diagrams, the aberrations of the imaging lenses according to Example 1 to Example 10 are corrected at high levels, and spherical aberration and axial chromatic aberration are very small.

Astigmatism, field curvature, and lateral chromatic aberration are also sufficiently small. Coma aberration and disorder of color differences thereof are restricted even in the outermost peripheral area. Distortion is also less than or equal to 1.5% in terms of the absolute value.

The imaging lenses according to Example 1 to Example 10 each have a half angle of view in a range of from about 25 to about 33 degrees, which indicates a semi-wide angle range; has an F-number of less than 3.0, which indicates a large aperture diameter; attains decreases in sizes for all the lens total length, lens total thickness, and lens diameter; has excellent imaging performance; and is applicable to an imaging element having a resolving power of 24,000,000 pixels or more.

"A camera or in other words a portable information terminal apparatus" is described below referring to FIGS. 21A, 21B, 21C, and 22.

An apparatus 30 described below is configured to "transmit information", and hence is a portable information terminal apparatus. The portable information terminal apparatus 30 has a camera function, and uses an imaging lens according to any one of Example 1 to Example 10 as an image-capturing optical system of a camera function device of the camera function.

Figure 22:
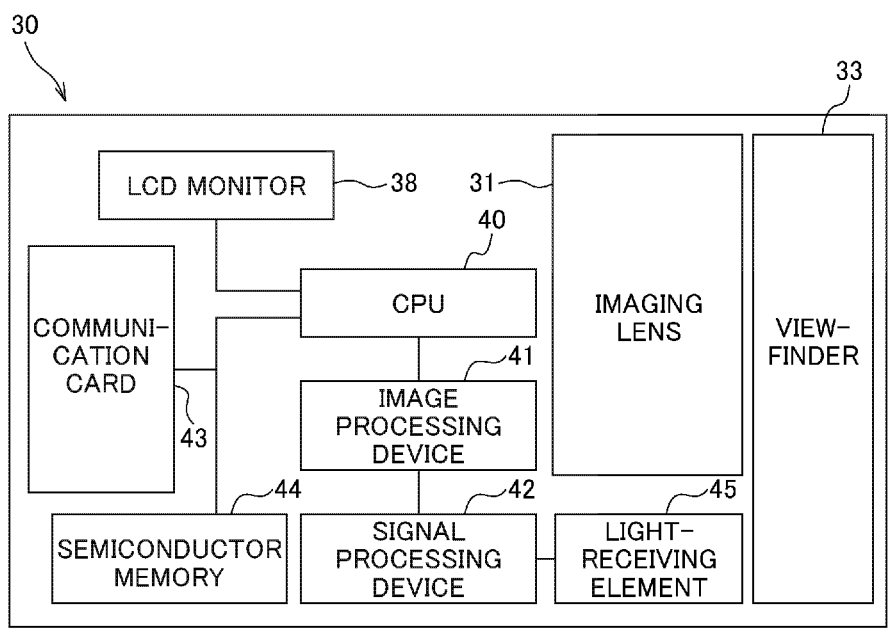
FIG. 22 is a system diagram of the portable information terminal apparatus illustrated in FIGS. 21A to 21C.

As illustrated in a system diagram in FIG. 22, the camera function device in the portable information terminal apparatus 30 is composed of an imaging lens 31 serving as an image-capturing optical system, and a light-receiving element 45 that is an imaging element (area sensor). The camera function device is configured to form an image of an image-capturing object on the light-receiving element 45 by the imaging lens 31, and to read the image by the light-receiving element 45.

An output from the light-receiving element 45 is processed by a signal processing device 42 that is controlled by a central processing unit (CPU) 40 to be converted into digital information. Image information digitized by the signal processing device 42 is processed with predetermined image processing by an image processing device 41 that is controlled by the CPU 40, and then is recorded in a semiconductor memory 44.

A liquid crystal display (LCD) monitor 38 can display an image during image-capturing, and can display an image recorded in the semiconductor memory 44. Moreover, the image recorded in the semiconductor memory 44 can be transmitted to an external device using a communication card 43 or the like.

Figure 21A:
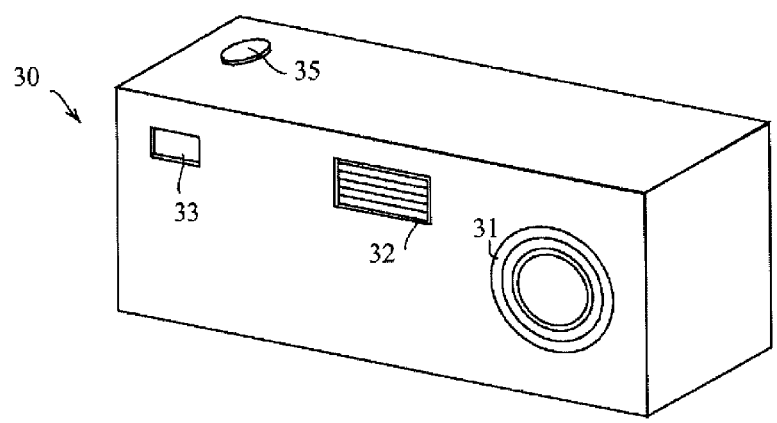
FIG. 21A is an external view to illustrate a portable information terminal apparatus according to an embodiment.
Figure 21B:
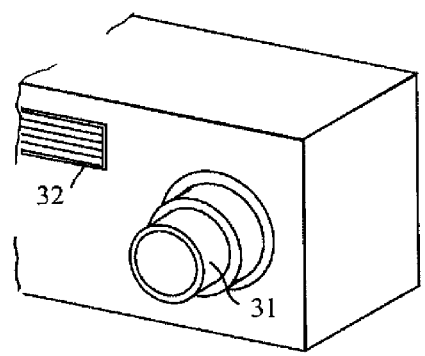
FIG. 21B is an external view to illustrate the portable information terminal apparatus according to the embodiment.
Figure 21C:
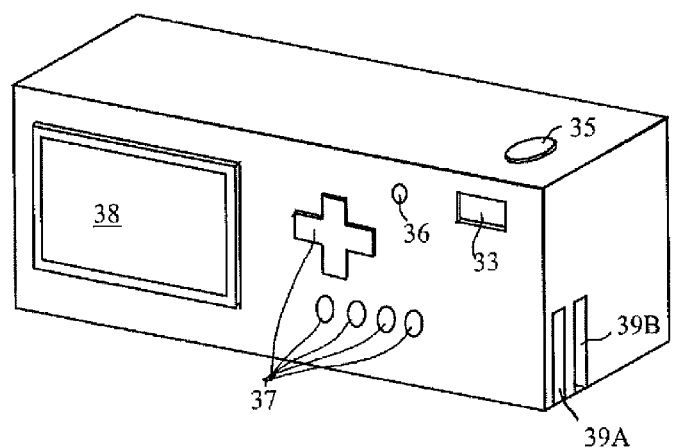
FIG. 21C is an external view to illustrate the portable information terminal apparatus according to the embodiment.

Referring to FIGS. 21A to 21C, when the portable information terminal apparatus 30 is carried, the imaging lens 31 is in a collapsed state as illustrated in FIG. 21A. When a user operates a power switch 36 (FIG. 21C) to turn on the portable information terminal apparatus 30, a lens barrel is extended as illustrated in FIG. 21B.

When a shutter release button 35 is half-pressed, focusing is performed. Focusing can be performed through movement of the whole imaging lens 31 in the optical-axis direction, or through movement of the light-receiving element 45. When the shutter release button 35 is further pressed, image-capturing is performed, and then the above-described processing is performed.

To display an image recorded in the semiconductor memory 44 onto the LCD monitor 38 or to transmit the image to an external device using the communication card 43 or the like, an operation button 37 is operated. The semiconductor memory 44 and the communication card 43 or the like are inserted into slots 39A and 39B, which are respectively dedicated for or general and common to the semiconductor memory 44 and the communication card 43 or the like.

When the imaging lens 31 is in the collapsed state, the lens groups of the imaging lens 31 may not be aligned along the optical axis. For example, the imaging lens 31 may have a mechanism in which the second lens group II is retracted from the optical axis and housed in parallel to the first lens group I. This mechanism can make the portable information terminal apparatus 30 thinner.

Since the imaging lens according to the disclosure is used for the imaging lens 31, a compact camera (a portable information terminal apparatus) with high image quality using a light-receiving element having 24,000,000 pixels or more can be provided. Although the desirable embodiments and examples of the disclosure have been described above, the disclosure is not particularly limited to such specific embodiments and examples unless otherwise particularly limited in the above description, and various modifications and changes can be made without departing from the spirit and scope of the disclosure as set forth in the appended claims.

The advantageous effects described in the embodiments and examples of the disclosure are merely desirable advantageous effects generated based on the disclosure. The advantageous effects according to the disclosure is not limited to "those described in the embodiments and examples".

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority pursuant to Japanese Patent Application No. 2019-041727, filed on Mar. 7, 2019, in the Japan Patent Office, the entire disclosure of which is hereby incorporated by reference herein.

REFERENCE SIGNS LIST

Ax Optical axis of imaging lens
I First lens group
II Second lens group
III Third lens group
IV Fourth lens group
S Aperture stop
F Various filters
Im Image surface

The invention claimed is:

1. An imaging lens consisting of:
sequentially from an object side to an image side, a first lens group, a second lens group having a positive refractive power, an aperture stop, a third lens group having a positive refractive power, and a fourth lens group having a negative refractive power,
wherein the first lens group includes, sequentially from the object side to the image side, a positive lens having a convex surface facing the object side and a negative lens having a concave surface facing the image side,
wherein the second lens group consists of one of:
two lenses in total including a negative lens and a positive lens, the negative lens being disposed closest to the object side and having a concave surface facing the object side; and
three lenses in total including two negative lenses and a positive lens, one of the two negative lenses being disposed closest to the object side and having a concave surface facing the object side,
wherein the positive lens of the second lens group is disposed closer to the image side than the negative lens disposed closest to the object side and has a convex surface facing the object,
wherein the third lens group consists of, sequentially from the object side to the image side, a positive lens having a convex surface facing the image side and a negative lens, wherein the fourth lens group is one of a single lens and a cemented lens, and has a surface facing the object side and a surface facing the image side, the surface facing the object side having a stronger refractive power than the surface facing the image side, and wherein at least one of (a) the negative lens disposed closest to the object side and the positive lens disposed closer to the image side than the negative lens in the second lens group are cemented together or (b) the positive lens and the negative lens of the third lens group are cemented together.

2. The imaging lens according to claim 1,
wherein a conditional expression 1.0<L/f<1.6 is satisfied,
where L is a distance from a surface disposed closest to the object side of the first lens group to an image surface in a state focused on an object at infinity and f is a focal length of a whole system in the state focused on the object at infinity.

3. The imaging lens according to claim 1,
wherein a conditional expression 0.45<DT/f<0.80 is satisfied,
where DT is a distance from a surface disposed closest to the object side of the first lens group to a surface disposed closest to the image side of the fourth lens group and f is a focal length of a whole system in a state focused on an object at infinity.

4. The imaging lens according to claim 1,
wherein a conditional expression 0.4<f1P/f<1.5 is satisfied
where f1p is a focal length of the positive lens in the first lens group and f is a focal length of a whole system in a state focused on an object at infinity.

5. The imaging lens according to claim 4,
wherein a conditional expression 0.25<r1F/f<0.55 is satisfied,
where r1F is a curvature radius of a surface on the object side of the positive lens in the first lens group and f is the focal length of the whole system in the state focused on the object at infinity.

6. The imaging lens according to claim 4,
wherein a conditional expression 0.8<r1F/r1R <1.6 is satisfied,
where r1F is a curvature radius of a surface on the object side of the positive lens in the first lens group and r1R is a curvature radius of a surface on the image side of the negative lens in the first lens group.

7. The imaging lens according to claim 1,
wherein a conditional expression −4.0<f4/f1<2.0 is satisfied,
where f4 is a focal length of the fourth lens group and f1 is a focal length of the first lens group.

8. The imaging lens according to claim 1,
wherein a conditional expression 0.25<f1-2/f3-4<5.0 is satisfied,
where f1-2 is a composite focal length of the first lens group and the second lens group and f3-4 is a composite focal length of the third lens group and the fourth lens group.

9. The imaging lens according to claim 1,
wherein a conditional expression −1.5<r2F/f<−0.5 is satisfied,
where r2F is a curvature radius of a surface on the object side of the negative lens disposed closest to the object side of the second lens group and f is a focal length of a whole system in a state focused on an object at infinity.

10. A camera comprising:
the imaging lens according to claim 1, the imaging lens being used as an image-capturing optical system.

11. A portable information terminal apparatus comprising:
the imaging lens according to claim 1, the imaging lens being used as an image-capturing optical system of a camera function device.

12. The imaging lens according to claim 1, wherein an output of the second lens group which enters the third lens group directly enters the third lens group.

13. An imaging lens consisting of:
sequentially from an object side to an image side, a first lens group, a second lens group having a positive refractive power, an aperture stop, a third lens group having a positive refractive power, and a fourth lens group having a negative refractive power, wherein the first lens group includes, sequentially from the object side to the image side, a positive lens having a convex surface facing the object side and a negative lens having a concave surface facing the image side, wherein the second lens group consists of two lenses in total including a negative lens and a positive lens, the negative lens being disposed closest to the object side and having a concave surface facing the object side;

wherein the positive lens of the second lens group is disposed closer to the image side than the negative lens disposed closest to the object side and has a convex surface facing the object, wherein the third lens group consists of, sequentially from the object side to the image side, a positive lens having a convex surface facing the image side and a negative lens, wherein the fourth lens group is one of a single lens and a cemented lens, and has a surface facing the object side and a surface facing the image side, the surface facing the object side having a stronger refractive power than the surface facing the image side, and wherein the positive lens and the negative lens of the third lens group are cemented together.

14. The imaging lens according to claim 13,
wherein a conditional expression 1.0<L/f<1.6 is satisfied,
where L is a distance from a surface disposed closest to the object side of the first lens group to an image surface in a state focused on an object at infinity and f is a focal length of a whole system in the state focused on the object at infinity.

15. The imaging lens according to claim 13,
wherein a conditional expression 0.45<DT/f<0.80 is satisfied,
where DT is a distance from a surface disposed closest to the object side of the first lens group to a surface disposed closest to the image side of the fourth lens group and f is a focal length of a whole system in a state focused on an object at infinity.

16. The imaging lens according to claim 13,
wherein a conditional expression 0.4<f1P/f<1.5 is satisfied
where f1p is a focal length of the positive lens in the first lens group and f is a focal length of a whole system in a state focused on an object at infinity.

17. The imaging lens according to claim 16,
wherein a conditional expression 0.25<r1F/f<0.55 is satisfied,
where r1F is a curvature radius of a surface on the object side of the positive lens in the first lens group and f is the focal length of the whole system in the state focused on the object at infinity.

18. The imaging lens according to claim 16,
wherein a conditional expression $0.8 < r1F/r1R < 1.6$ is satisfied,
where r1F is a curvature radius of a surface on the object side of the positive lens in the first lens group and r1R is a curvature radius of a surface on the image side of the negative lens in the first lens group.

19. The imaging lens according to claim 13,
wherein a conditional expression $-4.0 < f4/f1 < 2.0$ is satisfied,
where f4 is a focal length of the fourth lens group and f1 is a focal length of the first lens group.

20. The imaging lens according to claim 13,
wherein a conditional expression $-1.5 < r2F/f < -0.5$ is satisfied,
where r2F is a curvature radius of a surface on the object side of the negative lens disposed closest to the object side of the second lens group and f is a focal length of a whole system in a state focused on an object at infinity.

21. A camera comprising:
the imaging lens according to claim 13, the imaging lens being used as an image-capturing optical system.

* * * * *